United States Patent [19]

Marks

[11] Patent Number: 4,852,840

[45] Date of Patent: Aug. 1, 1989

[54] CLAMP FOR MOUNTING A DEVICE TO A TUBULAR

[76] Inventor: Dale H. Marks, 5402 Renwick, Houston, Tex. 77081

[21] Appl. No.: 242,346

[22] Filed: Sep. 6, 1988

[51] Int. Cl.⁴ ............................................. A47B 96/06
[52] U.S. Cl. ..................................... 248/230; 24/278; 362/147
[58] Field of Search ...................... 248/230, 229, 225.1, 248/231.5, 316.5, 316.1, 74.1; 362/147, 396; 24/271, 278, 285, 339

[56] References Cited

U.S. PATENT DOCUMENTS

| | | | |
|---|---|---|---|
| 2,775,806 | 1/1957 | Love | 24/271 |
| 3,425,127 | 2/1969 | Long et al. | 248/230 X |
| 3,706,437 | 12/1972 | Eberhardt | 248/230 |
| 3,784,140 | 1/1974 | Auerbach | 248/230 X |
| 4,355,922 | 10/1982 | Sato | 248/229 X |
| 4,616,797 | 10/1986 | Cramer | 248/231.5 X |
| 4,643,460 | 2/1987 | Lieberg | 24/271 X |

Primary Examiner—Ramon O. Ramirez
Attorney, Agent, or Firm—Browning, Bushman, Zamecki & Anderson

[57] ABSTRACT

An improved clamp for mounting a device, such as a theater lighting fixture, to a structural tubular is provided. The clamp includes a main body securable to the device to be mounted. A jaw is pivotally connected to the main body and moves from an open position to receive the tubular to a closed position such that the main body and the jaw encircle the tubular to provide high structural integrity. The jaw also moves along the pivot axis from an unlocked position wherein the jaw is spaced from the main body to a locked position wherein the jaw is substantially aligned with the main body. A lip may be provided in the jaw for fitting within a slot in the main body when the jaw is in the locked position, thus preventing the clamp from opening. A bolt carried on the jaw may be threaded for engaging the tubular and bringing a gripping surface on the main body into fixed engagement with the tubular.

24 Claims, 4 Drawing Sheets

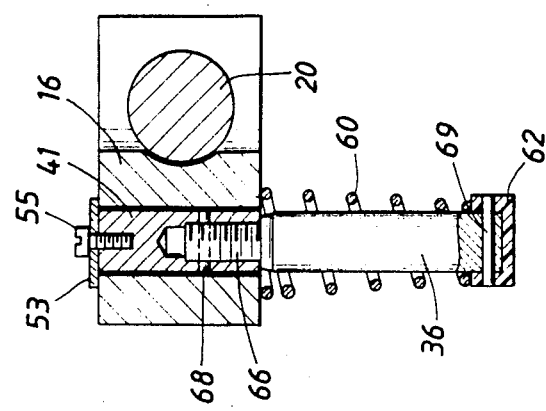
FIG. 5
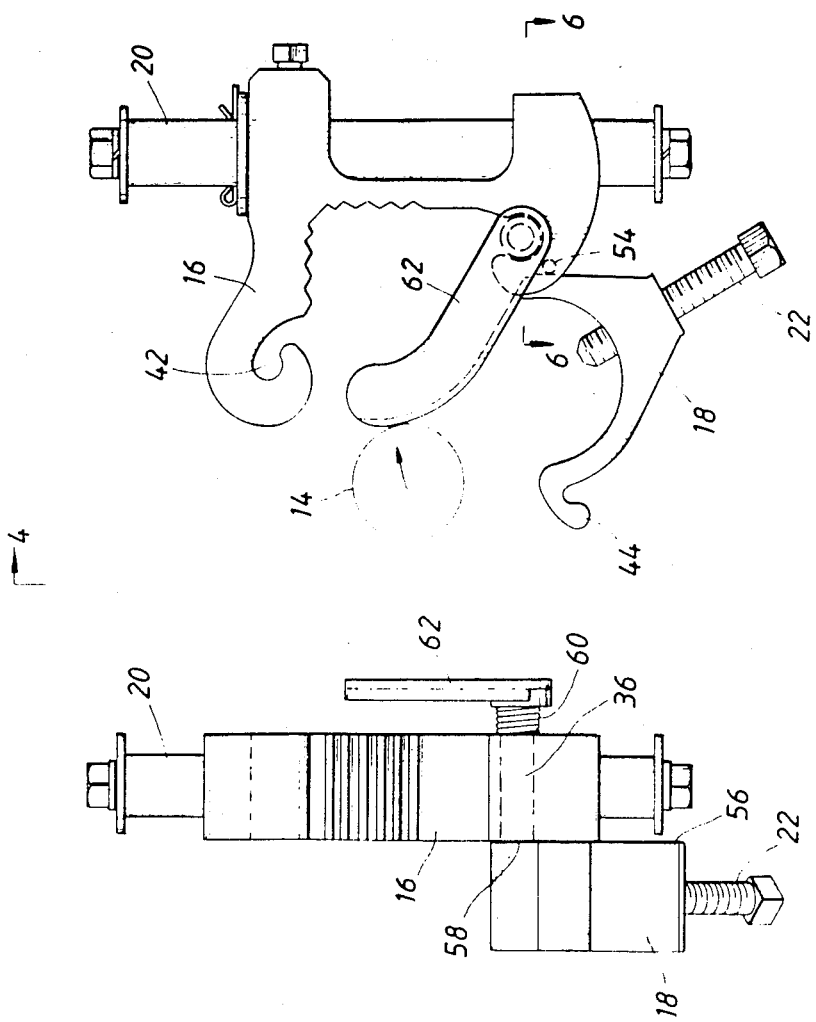
FIG. 3
FIG. 4

CLAMP FOR MOUNTING A DEVICE TO A TUBULAR

BACKGROUND OF THE INVENTION

1. Field of the Invention

The present invention relates to clamps suitable for mounting devices at selected locations along rod-like members and, more particularly, relates to an improved wrap-around clamp which may be quickly yet safely utilized to mount theater lighting fixtures to structural tubulars.

2. Description of the Background

Clamps of various types have long been utilized to mount devices to structural members. In the entertainment industry, for example, theater lighting fixtures are frequently mounted by clamps to horizontal and/or vertical structural tubulars arranged in a grid. Lighting fixtures are usually remounted to different structural tubulars between various theatrical productions to obtain a preferred lighting for the scene. Each clamp typically remains secured to its lighting fixture, so that a light can be quickly removed from one fixed location and set at a new location by releasing the clamp from one tubular and refixing the clamp to a different tubular or to a different position along the same tubular. Once the clamp is positioned on the tubular with the lighting fixture merely being suspended therefrom, it is desired that the operator be able to delay for various reasons without fear of the fixture falling before the clamp is tightened or secured to the tubular to lock the lighting fixture at its desired position.

In many situations, clamps provide the preferred structural connection between the item to be mounted and the structural tubular. In addition to the ease and speed of removing and remounting the device, the clamp should provide a high degree of safety, so that the mounted device will not fall, either when the clamp is loosely secured about the tubular so that the device is "hung" from a horizontal tubular (if the type of clamp so permits), and/or after the clamp is completely affixed to the structural tubular with the device at its desired orientation. Furthermore, it is desirable that a clamp may be used to mount the same device to structural tubulars of various diameters, is light weight, is relatively inexpensive to manufacture, and may be quickly and reliably used even by newly trained personnel.

One type of clamp used to mount theater lighting fixtures to structural tubulars is a C-clamp, which hooks over a horizontal tubular, and has a post extending downward from the lower portion of the C-shaped body for securing to the lighting fixture. A bolt is threaded to the body and projects generally upward to engage the tubular and fix the clamp body to the tubular. While this type of C-clamp may be used with tubulars of different sizes, the clamp can only be used for securing relatively light-weight fixtures, and the fixture position is practically limited to being directly beneath the horizontal tubular. Furthermore, it takes considerable time to back the bolt out a sufficient distance to clear the full diameter of the tubular of the clamp from the tubular, and then re-advance the bolt for engagement with the tubular particularly when going from a small tubular to a larger one.

The Sure Clamp manufactured by J. R. Clancey is a variation of a C-clamp, and has also been used to mount theater lighting fixtures. The lighting fixture may be initially suspended from a horizontal tubular using this clamp in a short amount of time, although a considerably longer time period is required to secure or tighten the clamp to the tubular. The lighting fixture is lifted vertically to remove the clamp from the tubular in a manner similar to that required for a C-clamp, and accordingly the clamp can only be utilized when sufficient head room above the tubular is provided. Since the clamp does not wrap-around or circumferentially encircle the tubular, it lacks sufficient structural integrity to be safely used to mount fixtures which are relatively heavy as compared to the size and weight of the clamp. Moreover, since the weight of the fixture is used to actuate the clamp, the clamp cannot be easily employed to mount a lighting fixture on inclined or vertical tubulars.

Another type of clamp employed to connect structural tubulars is the Nu-Rail clamp manufactured by Hollander. Crossing tubulars of a grid above a stage may be interconnected by the two separate clamp pieces, which include a pair of dove tail connections. One clamp piece includes a sleeve-like portion for sliding over one tubular, with a dovetail connection projecting from the sleeve-like portion. After the dovetail connections are made, a bolt through the other clamp piece may be tightened to secure the clamp to the second tubular. This type of clamp thus requires a good deal of time and manual dexterity to interconnect the structural tubulars. Moreover, the clamp is intended and may be safely employed on only one size tubular so that the clamp must be disconnected from the lighting fixture, and a new clamp reconnected to the fixture each time the fixture is to be mounted to a different sized tubular.

The need exists for an improved clamp to mount a device, such as a lighting fixture, to structural tubular members. Prior art clamps are difficult and/or time consuming to utilize, often requiring that the operator support the device while the clamp is secured to the tubular. Moreover, prior art clamps do not satisfy safety concerns, either because the clamp does not fully encircle the tubular and thus lacks structural integrity, or because the clamp may allow the suspended fixture to fall from a horizontal tubular before the clamp is tightened to the tubular. While some clamps are not able to mount a device on different sized tubulars, other clamps can only be reliably used to hang a device from a horizontal tubular rather than horizontal, vertical or inclined tubulars.

The disadvantages of the prior art are overcome by the present invention, and an improved clamp is hereinafter disclosed suitable for mounting various devices, such as lighting fixtures, to structural tubular members.

SUMMARY OF THE INVENTION

The clamp according to the present invention comprises a main body and a jaw, with the jaw being pivotally movable with respect to the main body such that the jaw can move from its opened position so that the clamp may receive the tubular to its closed position so that the main body and jaw fully encircle the tubular and thus provide high structural integrity. The jaw is also movable along its axis of rotation, i.e. in a direction parallel to the central axis of the tubular, from an axially separated and unlocked position to an axially locked position aligned with the main body. In the locked position, the jaw is prevented from rotating back to its opened position by engagement of a lip against the side walls of a slot. A securing bolt provided on the jaw may then be rotated to tightly engage the tubular and thus fix the main body to the tubular.

A lighting fixture may be secured to the main body and positioned so that a lever arm engages the tubular and thus rotates the jaw from its opened to its closed position. Once rotated to its closed position, a spring moves the jaw axially to its locked position, with the lip entering the slot to secure the clamp about the tubular. At this time, the lighting fixture is safely supported or secured about the tubular by the clamp. Thereafter, the clamp may be rigidly affixed to the tubular and the lighting fixture positioned at its desired orientation by rotating the securing bolt to bring the gripping surface on the main body into engagement with the tubular.

It is an object of the present invention to provide an improved clamp comprising a main body and a jaw which are pivotally interconnected to each other at one end and have interlocking mechanisms at their other ends for fully encircling a structural tubular.

It is another object of the present invention to provide a wrap-around clamp comprising a main body and a jaw which are pivotally interconnected, with the components being in an axially spaced relationship when the clamp is open for receiving the tubular, and wherein the jaw moves axially with respect to the main body from an unlocked position to a locked position about the tubular.

It is a feature of the invention to provide a wrap-around clamp which may be affixed to a device to be mounted, then the device and clamp moved toward the tubular so that the clamp engages and becomes automatically secured about the tubular. The present invention provides an improved clamp with a biasing mechanism for axially moving the jaw with respect to the main body from an unlocked to a locked position about the tubular.

It is a further feature of the present invention to provide an improved clamp which may be reliably utilized to mount a device to different sized tubular members, and to tubular members at different orientations. The low-cost clamp of the present invention may be reliably utilized to mount a theater lighting fixture to a tubular.

It is an advantage of the present invention that the clamp may be quickly affixed to a tubular with a minimum amount of adjustment, and the device may be removed from the tubular without having to lift the device a considerable distance above the tubular.

These and further objects, features and advantages of the present invention will become apparent from the following detailed description, wherein reference is made to the figures in the accompanying drawings.

BRIEF DESCRIPTION OF THE DRAWINGS

FIG. 3 is a side view of the clamp shown in FIG. 1 in its open position;

FIG. 4 is an end view of the clamp shown in FIG. 3:

FIG. 5 is a cross-sectional view along line 5—5 of the clamp shown in FIG. 2;

DETAILED DESCRIPTION OF PREFERRED EMBODIMENTS

Figure 1:
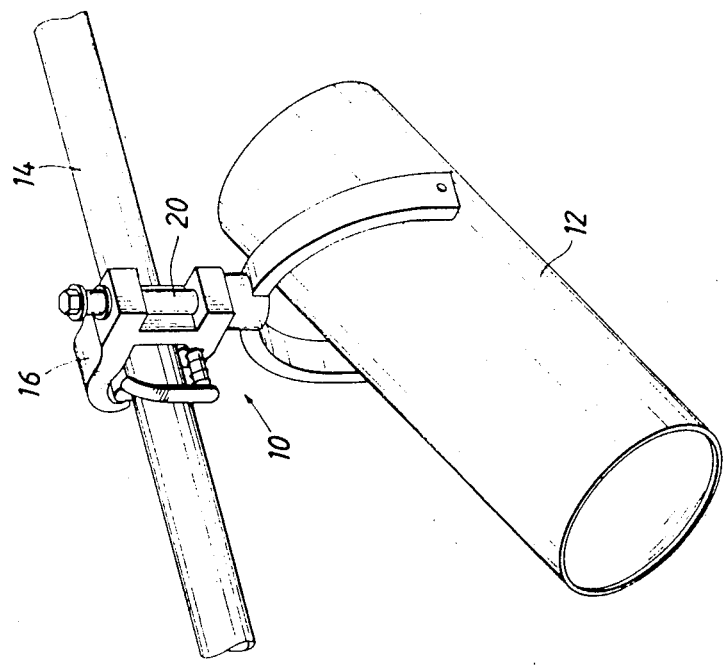
FIG. 1 is a pictorial view of a clamp according to the present invention supporting a lighting fixture from a horizontal structural tubular member.

Referring to FIG. 1, the clamp 10 of the present invention is depicted for securing a theater lighting fixture 12 to a generally horizontal tubular member 14. The lighting fixture may be of various types which have fixed or variable focus framing, and may range in weight from 20 to 160 pounds. The structural tubular member 14 onto which the lighting fixture is mounted may be part of a grid of tubular members which is commonly provided above a theater stage. Although the clamp of the present invention is particularly well suited for mounting a lighting fixture to a standard horizontal tubular, the same clamp 10 may also be used to mount a lighting fixture to a vertical or inclined tubular, as explained subsequently. Also, it should be understood that the term "tubular" is intended to mean any elongate member having a generally cylindrical outer configuration, and specifically includes tubing, pipes, conduits, rods, and other structural members of various diameters. However, the clamp 10 and/or modifications thereof can also be used to mount fixtures to elongate structural members of noncircular cross-section.

Figure 2:
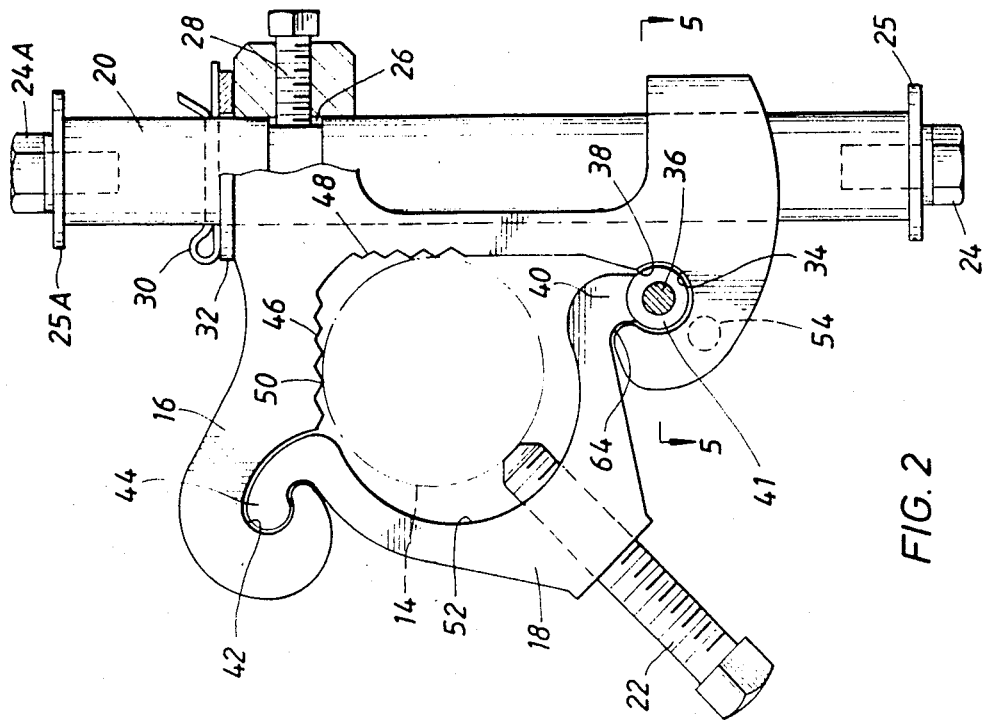
FIG. 2 is a side view, partially in cross-section, of the clamp shown in FIG. 1.

Referring now to FIGS. 1 and 2, the clamp 10 comprises a main body 16 which serves as an interconnection member between the lighting fixture and the tubular, a jaw 18 pivotally mounted to the main body 16 and acting as a mating member with the main body to fully encircle the tubular. The clamp 10 also includes a mounting pin 20 for innerconnecting the main body 16 and a lighting fixture 12, and a securing bolt 22 threaded to the jaw 18 for engaging the tubular member 14 and forcing the main body 16 into gripping engagement with the tubular.

FIGS. 1 and 2 depict the clamp 10 mounted so that the pin 20 is substantially vertical, and its axis is substantially perpendicular to and spaced from the central axis of the tubular 14. A lighting fixture may be supported at the lower end of the pin 20 by bolt 24 and washer 25. If the tubular 14 were vertical, however, a lighting fixture could be mounted at each end of the substantially horizontal pin 20, so that another lighting fixture may be secured to the pin 20 by bolt 24A and washer 25A. A recess 26 in the pin is adapted to receive the end of locking bolt 28 threaded to the body 16, thereby preventing axial or rotational movement of the pin 20 with respect to the body 16. Recess 26 also prevents burrs formed by torqued rotation of bolt 28 from galling the main body 16. The clamp of the present invention may thus be used to mount a lighting fixture to a vertical or inclined tubular, but is particularly well suited for use with a substantially horizontal tubular, as described subsequently.

When the bolt 28 is unthreaded so that its end passes outside of the recess 26, a cotter pin 30 nevertheless prevents the weight of the lighting fixture from moving the pin 20 downward. Once the bolt 28 is unthreaded, the pin 20 and the lighting fixture may be rotated with respect to he body 16 and the tubular to alter the orientation of the fixture, then the bolt 28 may be retightened to fix the light at its newly selected location. It is also within the concept of the present invention to allow the pin 20 to move axially with respect to the main body 16, so that the height of the lighting fixture with respect to the horizontal tubular may be adjusted. A replaceable washer 32 is provided for preventing the weight of the fixture from damaging the body 16 when the bolt 28 is unthreaded, and acts as a close tolerance bushing with pin 20 to prevent the cotter pin 30 from entering the annulus between the pin 20 and the body 16.

The main body 16 as shown in FIG. 2 has a substantially inverted L-shaped configuration, with a cavity 34 at its lower end defined by a wall having a C-shaped cross-section for receiving a cylindrical post or stem 36 fixed to the jaw 18. The cavity 34 has a restricted diameter throat 38 for receiving a portion 40 of the jaw 18, yet retains the jaw 18 interconnected with the body 16 at all times. At the opposite end of the body 16, a slot 42 is provided for receiving lip portion 44 of the jaw 18. A pin 54 projecting outwardly from the main body acts as a stop to limit rotation of the jaw with respect to the main body when the clamp is in its open position. The interior surface of the body 16 includes a pair of gripping surfaces 46, 48, which are perpendicular to each other and include serrations or teeth 50 for biting engagement with the tubular 14. The surface 46 is substantially horizontal and the slot 42 is generally above the surface 46, so that the clamp need not be lifted vertically any substantial distance to remove the clamp and lighting fixture from a generally horizontal tubular. The clamp 10 is designed for gripping engagement with various diameter tubulars. Surface 52 of the jaw 18 has an arcuate configuration sized to receive the maximum diameter tubular to which the lighting fixture may be secured by the clamp 10.

FIGS. 3 and 4 depict the clamp 10 in its opened position for receiving a tubular. The post 36 is secured to the jaw 18 and extends therefrom to fit within the cavity 34, so that the jaw may freely rotate with respect to the body 16 about the pivot axis provided by cavity 34. In its opened position, the jaw 18 is axially spaced from the body 16, so that a planar surface 56 of the jaw slidingly engages the planar surface 58 of the main body. Also, this axial separation compresses spring 60 provided on the post 36 between the main body and the lever arm 62 at the end of the post 36. As shown in FIG. 2, the center of gravity for the jaw 18 when in the closed position is between the post 36 and the bolt 22, so that the jaw 18 automatically rotates by gravity to its opened position against stop pin 54 affixed to the main body 16. The lever arm 62 is secured to the jaw 18 by post 36, so that forced rotation of the lever arm 62 by engagement with the tubular 14 will automatically rotate the jaw 18 from its open position as shown in FIG. 3 to its closed position.

Figure 6:
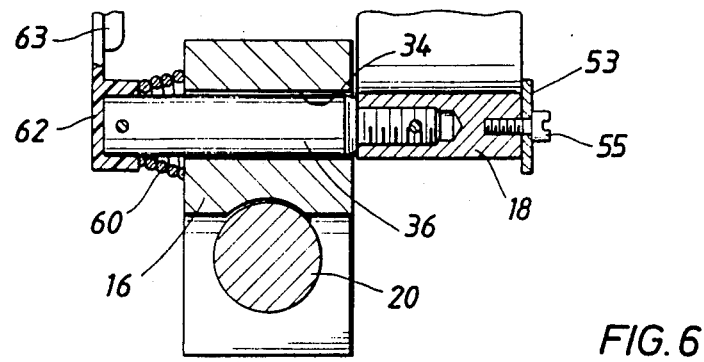
FIG. 6 is a cross-sectional view along line 6—6 of the clamp shown in FIG. 3.

Further details regarding the axial movement of the jaw from its closed position (wherein the jaw and main body fully encircle the tubular but are axially separated) to its locked position (when the jaw and main body are rotatably locked together on the tubular and are axially aligned), may be understood by a comparison of FIGS. 5 and 6. When the jaw is in the opened position as shown in FIGS. 3 and 6, the jaw 18 and main body 16 are spaced along the pivot axis, and the helical spring 60 is compressed between the main body and lever arm 62. At this time, the post or lever stem 36 within the cavity 34 allows the jaw to pivot to the closed position, while the jaw continually remains secured to main body 16. Once the jaw 18 is in its closed position, the lip portion 44 may enter the slot 42, and the portion 40 of the jaw passes by the end 64 (see FIG. 2) of the main body. The spring 60 then automatically moves the jaw 18 from its closed to its locked position, so that it is aligned with and locked to the main body 16. In the locked position the main body and jaw are thus each within the same radial plane along the pivot axis. The end portion 41 of the jaw as shown in FIG. 2 retains a generally cylindrical configuration and thus serves as a functional extension of the post 36, so that the jaw remains pivotally connected to the main body when in its open, closed, or locked positions.

FIG. 5 shows the clamp in its locked position, with the spring 60 having pulled the portion 41 of the jaw 18 into the cavity 34. A washer 53 or other abutment member secured to the end portion 41 of the jaw 18 by screw 55 engages the body 16 when the clamp is in its locked position, thereby limiting axial movement of the jaw caused by spring 60 when in its closed position, the jaw and body are thus aligned and cooperate to fully encircle the tubular. FIG. 5 also depicts the post 36 threaded to the portion 41 of the jaw by threads 66. The post 36 may be further fixed to the jaw by pin 68, and the lever arm 62 fixed to the post 36 by a similar pin 69.

Referring to FIGS. 1 and 3, it should thus be understood that a lighting fixture may initially be secured to the clamp by pin 20, and the assembly manually manipulated so that the clamp 10 is generally adjacent the horizontal tubular 14. In this position, the clamp and lighting fixture may be pressed toward the tubular member (see FIG. 3) so that the tubular member 14 engages the lever arm 62 and rotates the jaw 18 and thus forces the jaw from its opened position to its closed position. Once the jaw 18 reaches its closed position, the spring 60 automatically moves the jaw 18 axially so that the lip portion 44 of the jaw enters the slot 42, at which time the clamp is in its locked position. The movement of the jaw from its closed to its locked position occurs very quickly, and thus it should be understood that the jaw assentially moves instantaneously and automatically to its locked position once it is rotated to its closed position. In this locked position, the operator may release the lighting fixture since the clamp 10 safely secures the fixture about the horizontal tubular 14.

Thereafter, the operator may rotate the bolt 22, causing the end of the bolt to engage the tubular 14 and bring the surfaces 46 and 48 into biting engagement with the tubular, thereby fixing the position of the clamp with respect to the tubular. The width of the "mouth" of body 16 as shown in FIG. 2 is generally between surface 64 and the sidewall of slot 42 (slots 34 and 42 are generally diametrically opposed with respect to the largest tubular for which the clamp is designed) so that the jaw 18 closes over the mouth of the body 16 so that the jaw and body fully encircle the tubular. Before the lighting fixture is raised to its position adjacent the tubular, the bolt 22 may be threaded to the jaw 18 to a position just short of that required to press the surfaces 46 and 48 into biting engagement with the tubular when the jaw is in its closed or locked position. In other words, the bolt itself does not define one end of the mouth of the clamp. Thus, an advantage of the present invention is that only a few turns of the bolt 22 are thus necessary to fix the position of the clamp 10 with respect to the tubular if the bolt 22 is preadjusted.

Once the clamp 10 is fixed to the tubular 14, the pin 20 may be rotated to orient the light at its desired position, at which time the locking bolt 28 may be tightened into engagement with the pin 20 to lock the position of the fixture with respect to the clamp.

The lever arm 62 and/or the pst 36 described herein may be fabricated from a flexible plastic or the like, while the remaining components of the clamp are fabricated from metal. An advantage of having a plastic lever arm is that the lever arm may flex and return to its original position rather than bend or break if the clamp is inadvertently dropped. The substantially planar lever arm 62 may be provided with perpendicular reinforcing gusset portion 63 (see FIG. 6) to ensure that the lever arm retains sufficient rigidity to rotate the jaw 18 from its opened to its closed position when it engages the tubular, as described above.

Figure 7:
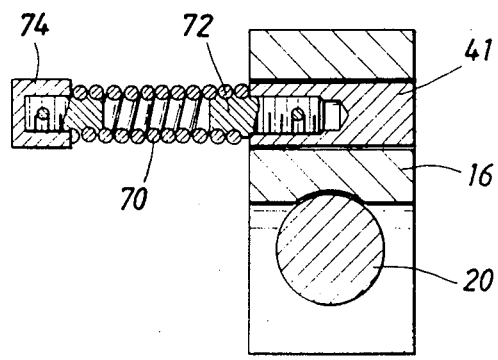
FIG. 7 is a cross-sectional view of an alternate embodiment of the clamp depicted in FIG. 6.

FIG. 7 discloses an alternative embodiment of a jaw to lever arm connection. Spring 70 is secured at one end to stud 72, which in turn is threaded to portion 41 of the jaw. The other end of spring 70 is secured to the lever arm 74 which ay be formed from metal or plastic material. Spring 70 provides the desired flexing action between the jaw and the lever arm so that the lever arm will not bend or break. Although spring 70 does not provide a biasing force to bring the jaw 18 into axial alignment with the main body so that the clamp is moved to its locked position, this biasing force could be provided, if desired, by another helical spring (not shown) as previously described. Since spring 70 provides a flexible connection between the jaw 18 and the lever arm 74 to decrease the likelihood that the lever arm will become damaged or broken if the clamp is dropped, the lever arm 74 as shown in FIG. 7 may be substantially similar to the lever arm 62 previously discussed, but may be fabricated from metal because of the flexible connection to the jaw.

Figure 8:
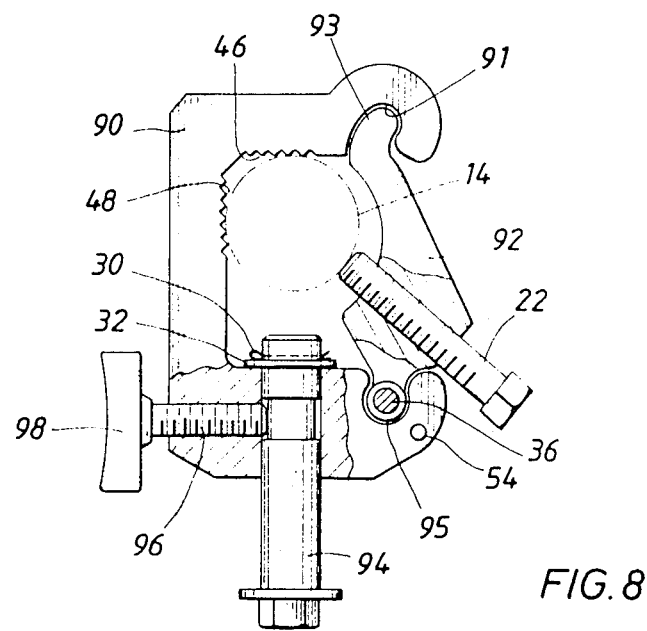
FIG. 8 is a side view, partially in cross-section, of an alternate embodiment of a clamp according to the present invention.

FIG. 8 discloses an alternate embodiment of the clamp in its closed position. The main body 90 has a substantially C-shaped configuration, so that the slot 91 for receiving the lip portion 93 of the jaw 92 and the cavity 95 for receiving the post 36 are on the same side of the tubular 14. Mounting pin 94 is secured to the main body 90 so that its axis is substantially perpendicular to and passes substantially through the central axis of the tubular 14. The pin 54 limits rotation of the jaw when the clamp is in its open position, as previously discussed. An advantage of this embodiment compared to that previously discussed is that the weight of the lighting fixture is directly below the tubular, and accordingly there is little if any rotational force on the body 6 due to the weight of the lighting fixture which would tend to cause the clamp and fixture to rotate with respect to the tubular 14. Moreover, since the C-shaped body does not hook over the tubular in the manner similar to prior art C clamps, and since the jaw 92 locks to the body 90 to secure the clamp about the tubular, the clamp and fixture need not be lifted vertically to remove the assembly from a horizontal tubular. The clamp as shown in FIG. 8 thus has high structural integrity, but may be used to secure a fixture to a tubular with a very slight head space above the tubular. Since axial movement of the pin 94 with respect to the body 90 is not contemplated, the mounting pin terminates directly above the cotter pin 30 and washer 32, thereby leaving sufficient room for the tubular. The center of gravity for the jaw 92 (including bolt 22 secured thereto) causes the jaw to automatically rotate by gravity from its closed (but unlocked) position to its open position, so that the clamp and lighting fixture may easily be removed from the tubular. Also, the bolt 96 is similar to the bolt 28 previously discussed, but includes a wing end 98 for ease of rotation without tools.

Figure 9:
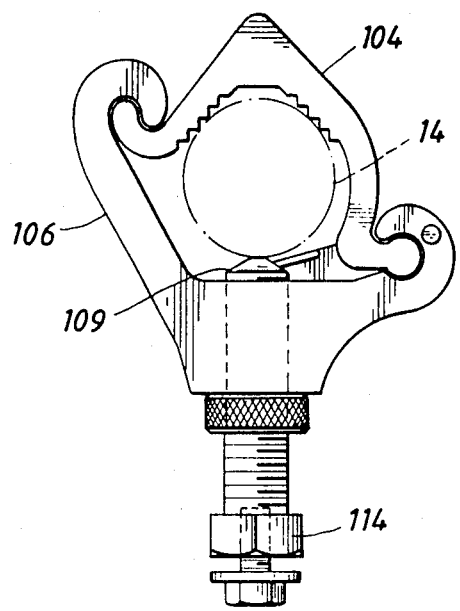
FIG. 9 is a side view of a further embodiment of a clamp according to the present invention.
Figure 10:
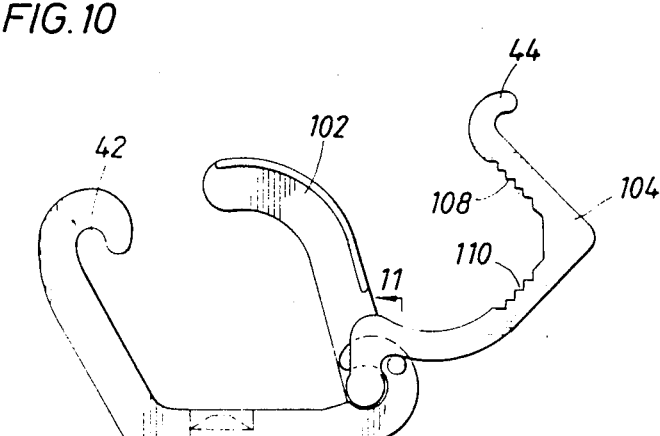
FIG. 10 is a side view of the clamp shown in FIG. 9 in its open position.
Figure 11:
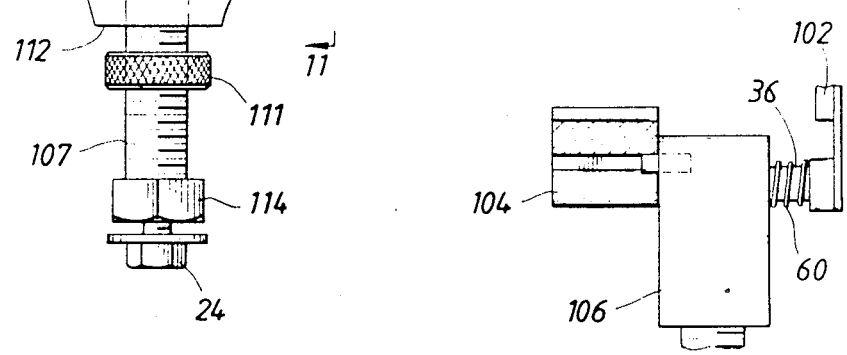
FIG. 11 is a cross-sectional view along line 11—11 of the clamp shown in FIG. 10.

Still another embodiment of the clamp according to the present invention is shown in FIGS. 9-11. FIG. 10 illustrates the clamp in its opened position, with the lever arm 102 adapted to move the jaw 104 to its closed position by engagement with the tubular as the lighting fixture and clamp are moved upward toward the tubular. Once in its closed position, the spring 60 automatically moves the jaw axially so that the lip portion 44 enters the slot 42, and the jaw becomes axially aligned with and locked to the main body 106.

In this latter embodiment, the function of the mounting pin and the bolt 22 have been combined, and each function is served by the bolt 107 threaded to the main body. Moreover, the gripping surfaces 108 and 110 have been provided on the jaw rather than the main body. Once the jaw 104 is locked to the main body, the bolt 107 may be rotated so that the end 109 of the bolt engages the tubular 14 (see FIG. 9) and forces the surfaces 108 and 110 into gripping engagement with the tubular. Thereafter, the nut 111 may be rotated to engage the end surface 112 of the main body, thereby reducing the likelihood that the bolt 107 will inadvertently become unthreaded from the main body.

For each of the clamps described herein, the clamp may be easily disconnected from the tubular by loosening the bolt 22 or 107, then manually pressing the post 36 toward the main body, thereby moving the lip portion 44 out of engagement with the slot 42. Once the jaw and main body are no longer rotatably locked together, the jaw may automatically rotate by gravity or may be manually moved to its opened position, so that the clamp can be removed from the tubular member. The clamp may then remain in its opened position and remain secured to the lighting fixture until the fixture is rehung on a tubular.

The embodiments described may be used for mounting a lighting fixture to a vertical or inclined tubular member. In this case, a lighting fixture may be positioned at one end or both ends of the mounting pin 20, and the lighting fixture and clamp moved so that the lever arm engages the vertical or inclined tubular. Once the jaw has closed about the tubular and is axially aligned with the main body, the bolt 22 should immediately be tightened so that the lighting fixture remains at its desired position and does not slide down the vertical or inclined tubular. When used for mounting a fixture to a vertical or inclined tubular, an advantage of the present invention compared to prior art C-clamps relates to the "wrap around" design of the main body and jaw which together encircle the tubular. This wrap around design allows high torque to be applied to the securing bolt 22 to lock the clamp in a non-slip manner to the tubular without substantial risk that this increased torque will cause failure of the main body or jaw.

Although the invention is particularly well suited for suspending lighting fixtures from tubulars, it should be understood that the clamp of the present invention may be used for suspending various devices from tubulars. The pin may thus be modified to enable the device to be suspended to be secured to the main body of the clamp. Other conventional securing techniques, such as bolting, welding, etc. may also be used to secure the device to the main body of the clamp.

The embodiments described herein employ a locking slot in the main body and a lip secured to the jaw for filling within the locking slot and preventing the clamp from opening when in its locked position. It should be understood, however, that the locking slot could be provided on the jaw and the lip provided on the main body. Alternatively, a slot and lip need not be provided for preventing the jaw from pivotably moving to its open position, since a planar or arcuate stopping surface fixed on the main body need only be provided for engaging a similar locking surface fixed on the jaw for preventing the jaw from rotating to its open position while it is aligned with the main body.

As another variation on the embodiments described above, one end of a spring may be fixed to the main body and another end of the spring fixed to the jaw, so that the spring would automatically bias the jaw from its open to its closed position. In this embodiment, the lever arm may be eliminated, although the spring provided for axially moving the jaw from its closed to its locked position could optionally be provided. An operator may then rotate the jaw to its open position, such that the spring exerts an increased rotational force tending to return the jaw to its position for engaging the tubular member while holding the jaw in this open position. Thereafter, the jaw may be released so that it automatically moves to its closed or closed and locked position. Bolt 22 may subsequently be rotated to bring the gripping surfaces on the clamp into biting and fixed engagement with the tubular member.

Securing members other than bolt 22 may be used to bring the gripping surfaces into engagement with the tubular. A wedge could, for example, be fixed between the main body and the tubular to force the gripping surface on the jaw into engagement with the tubular. Also, the main body and jaw may be prevented from rotating to the opened position while in the locked position by locking mechanisms other than a slot and a lip for fitting within the slot, although the locking mechanism is preferably simple and is activated automatically upon movement of the jaw along the pivot axis to a position substantially aligned with the main body.

The foregoing disclosure and description of the invention is illustrative and explanatory thereof, and various changes in the details of the illustrated apparatus may be made within the scope of the appended claims without departing from the spirit of the invention.

What is claimed is:

1. A clamp for mounting a device to an elongate member, the clamp comprising:
    a main body securable to the device and having a pivot axis and a stop surface thereon;
    a jaw mounted to the main body and pivotally movable with respect thereto about the pivot axis of the main body from an opened position such that the clamp may receive the structural tubular to a closed position such that the main body in combination with the jaw encircle the structural tubular;
    one of either the main body or the jaw having an internal surface for engagement with the structural tubular;
    the jaw mounted to the main body such that the jaw is further movable with respect to the main body in a direction along the pivot axis from an unlocked position wherein the jaw is spaced from the main body to a locked position wherein the jaw is substantially aligned along the pivot axis with the main body;
    the jaw including a locking surface for engagement with the stop surface on the main body when the jaw is in its locked position, thereby preventing the jaw from pivotably moving to its opened position; and
    a securing member carried by and selectively movable with respect to he other of the main body or the jaw for engaging the structural tubular and bringing the internal surface into tight engagement with the structural member when the jaw is in its locked position.

2. The clamps defined in claim 1, further comprising:
    the main body having a cavity defined by a C-shaped cross-sectional wall, the cavity having a restricted diameter open throat for receiving a portion of the jaw;
    a post affixed to and protruding outward from the jaw for fitting within the C-shaped cavity of the main body for enabling the jaw to rotate about the pivot axis of the main body and move along the pivot axis with respect to the main body.

3. The clamp as defined in claim 2, wherein the pivot axis of the main body is substantially parallel with the length of the structural member when the internal surface is in tight engagement with the structural tubular.

4. The clamp as defined in claim 1, further comprising:
    a biasing member for biasing the jaw toward the main body in a direction along the pivot axis and to its locked position, and
    an abutment member secured to the jaw for engaging the main body and limiting movement of the jaw along the pivot axis when the jaw and main body are substantially aligned along the pivot axis.

5. The apparatus as defined in claim 1, further comprising:
    a lever arm secured to the jaw for engagement with the structural member to rotate the jaw from its opened position to its closed position.

6. The clamp as defined in claim 1 wherein the internal surface includes first and second gripping surfaces disposed angularly with respect to each other for simultaneous engagement with the structural member.

7. The clamp as defined in claim 6, wherein the securing member is a bolt threadably secured to the jaw, the bolt having its axis passing generally between the first and second gripping surfaces when the jaw is in its locked position.

8. The clamp as defined in claim 7, wherein the first and second gripping surfaces are substantially perpendicular, and each gripping surface has gripping formations thereon.

9. The clamp as defined in claim 1, further comprising:
    a. stop member secured to the main body for limiting rotation of the jaw with respect to the main body when in its opened position.

10. The clamp as defined in claim 5, wherein the lever arm is flexibly secured to the jaw.

11. The clamp as defined in claim 5 wherein the lever arm is flexible.

12. A clamp for mounting a lighting fixture to a structural tubular having a central axis, the clamp comprising:
    a main body adapted to be secured to the lighting fixture and having a pivot axis adjacent one end thereof and a stop surface adjacent an opposing end thereof;

a jaw mounted to the main body and pivotably movable thereto about the pivot axis of the main body from an opened position such that the clamp may receive the structural tubular to a closed position such that the main body in combination with the jaw encircle the structural tubular:

one of the main body or the jaw having an internal gripping surface for engagement with the structural tubular;

the jaw further movable with respect to the main body along the pivot axis from an unlocked position wherein the jaw is axially spaced from the main body to a locked position wherein the jaw is substantially aligned along the pivot axis with the main body;

a biasing member for biasing the jaw toward the main body in a direction along the pivot axis and to its locked position;

a lever arm secured to the jaw for engagement with the structural tubular to rotate the jaw from its opened position to its closed position;

a locking surface secured to the jaw for engagement with the stop surface when the jaw is in its locked position, thereby preventing the jaw from pivotably moving to its opened position; and a bolt threadably secured to the other of the main body or the jaw for engaging the structural tubular and bringing the internal gripping surface into gripping engagement with the structural tubular when the jaw is in its locked position.

13. The clamp as defined in claim 12, further comprising:

the main body having a cavity defined by a C-shaped cross-sectional wall, the cavity having a restricted diameter open throat for receiving a portion of the jaw;

a post affixed to and protruding outward from the jaw for fitting within the C-shaped cavity of the main body for enabling the jaw to rotate about the pivot axis of the main body and move along the pivot axis with respect to the main body.

14. The clamp as defined in claim 12, further comprising:

a mounting pin secured to the main body for securing the lighting fixture to the main body; and the mounting pin having an axis perpendicular to and spaced from the central axis of the tubular when the gripping surfaces in engagement with the tubular.

15. The clamp as defined in claim 12, further comprising:

a mounting pin secured to the main body for securing the lighting fixture to the main body; and the mounting pin having an axis perpendicular to and passing substantially through the central axis of the tubular when the gripping surface is in engagement with the tubular.

16. The clamp as defined in claim 15, wherein the jaw is pivotably mounted to the main body such that its center of gravity causes the jaw to rotate by gravity from its closed position to its open position when the gripping surface is in engagement with the tubular.

17. The clamp as defined in claim 12, wherein the bolt has a mounting pin end for securing the lighting fixture to the main body.

18. A clamp for mounting a device to a tubular, the clamp comprising:

an interconnection member having a locking slot therein;

a mating member mounted to the interconnection member and pivotably movable with respect thereto about a pivot axis from an opened position such that the clamp may receive the tubular to a closed position such that the interconnection member in combination with the mating member encircle the tubular;

one of either the mating member or interconnection member having a gripping surface for gripping engagement with the tubular;

the mating member mounted to the main body such that the mating member is further movable with respect to the interconnection member in a direction along the pivot axis from an unlocked position wherein the mating member is spaced from the interconnection member to a locked position wherein the mating member and interconnection member are within the same radial plane with respect to the pivot axis;

a lip secured to the mating member for fitting within the locking slot in the interconnection member when the mating member is in its locked position, thereby preventing the mating member from pivotally moving to its opened position; and a securing member carried by and selectively movable with respect to the other of the mating member or the interconnection member for engaging the tubular and bringing the gripping surface into engagement with the tubular when the mating member is in its locked position.

19. The clamp as defined in claim 18, further comprising:

the interconnection member having a cavity defined by a C-shaped cross-sectional wall, the cavity having a restricted diameter open throat for receiving a portion of the mating member;

a post affixed to and protruding outward from the mating member for fitting within the C-shaped cavity of the interconnection member for enabling the mating member to rotate about the pivot axis and move along the pivot axis with respect to the interconnection member.

20. The clamp as defined in claim 18, further comprising:

a biasing member for biasing the mating member toward the main interconnection member in a direction along the pivot axis to its locked position.

21. The apparatus as defined in claim 19, further comprising:

a lever arm secured to the post for engagement with the tubular to rotate the mating member from its opened position to its closed position.

22. The clamp as defined in claim 18, wherein the gripping surface includes first and second gripping surfaces for simultaneous engagement with the tubular; and the securing member is a bolt threadably secured to the mating member and aligned between the first and second surfaces on the interconnection member when the mating member is in its locked position.

23. A clamp for mounting a device to an elongate structural member, the clamp comprising:

a main body securable to the device and having a pivot axis and a first locking member;

a jaw mounted to the main body and pivotally movable with respect thereto about the pivot axis of the main body from an opened position such that the clamp may receive the structural member to a closed position such that the main body in combination with the jaw encircle the structural member;

one of either the main body or the jaw having an internal surface for engagement with the structural member;

the jaw further movable with respect to the main body along the pivot axis from an unlocked position wherein the jaw is spaced from the main body to a locked position wherein the jaw is substantially aligned along the pivot axis with the main body;

a second locking member on the jaw cooperative with the first locking member when the jaw is in its locked position to prevent the jaw from pivotally moving to its opened position;

resilient biasing means cooperative between said main body and said jaw for urging said jaw axially along the pivot axis to its locked position;

abutment means cooperative between said main body and said jaw preventing said jaw from moving axially along said pivot axis when the jaw is in its locked position; and a lever arm secured to the jaw for engagement with the structural member to rotate the jaw from its opened position to its closed position.

24. The clamp as defined in claim 23, wherein said locking members are adapted to automatically engage each other when the jaw is moved from its unlocked position to its locked position.

* * * * *

UNITED STATES PATENT AND TRADEMARK OFFICE
CERTIFICATE OF CORRECTION

PATENT NO. : 4,852,840

DATED : August 1, 1989

INVENTOR(S) : Dale H. Marks

It is certified that error appears in the above-identified patent and that said Letters Patent is hereby corrected as shown below:

In column 10, line 9, delete "he" and insert therefor --the--.

In column 10, line 14, delete "clamps" and insert therefor --clamp as--.

In column 11, line 51, delete "surfaces" and insert therefor --surface is--.

Signed and Sealed this

Twenty-ninth Day of May, 1990

Attest:

HARRY F. MANBECK, JR.

*Attesting Officer*      *Commissioner of Patents and Trademarks*